United States Patent [19]

Quan et al.

[11] Patent Number: 5,308,595
[45] Date of Patent: May 3, 1994

[54] PROCESS FOR THE EXTRACTION OF GALLIUM

[75] Inventors: Peter M. Quan, Rochdale; Stephen W. Leeming, Flixton, both of England

[73] Assignee: Imperial Chemical Industries PLC, London, England

[21] Appl. No.: 976,395

[22] Filed: Nov. 13, 1992

Related U.S. Application Data

[60] Division of Ser. No. 884,230, May 11, 1992, Pat. No. 5,183,940, which is a continuation of Ser. No. 68,136, Jun. 29, 1992, abandoned.

[30] Foreign Application Priority Data

| Jul. 14, 1986 | [GB] | United Kingdom | 8617118 |
| Oct. 1, 1986 | [GB] | United Kingdom | 8623570 |
| May 15, 1987 | [GB] | United Kingdom | 8711539 |

[51] Int. Cl.$^5$ ............ C22B 58/00; C01G 15/00; C07C 215/50; B01D 11/04
[52] U.S. Cl. ................... 423/112; 423/131; 564/370
[58] Field of Search .............. 423/112, 131; 210/902; 564/370; 546/134

[56] References Cited

U.S. PATENT DOCUMENTS

| 2,459,112 | 1/1949 | Oberright | 564/370 |
| 3,098,841 | 7/1963 | Morris | 564/370 |
| 3,214,376 | 10/1965 | Morway | 564/370 |
| 3,678,000 | 7/1972 | Adams | 564/370 |
| 4,217,235 | 8/1980 | Karlsson | 564/390 |
| 4,242,212 | 12/1980 | Hanson | 564/370 |
| 5,183,940 | 2/1993 | Quan et al. | 564/370 |

Primary Examiner—Mukund J. Shah
Assistant Examiner—P. K. Sripada
Attorney, Agent, or Firm—Cushman, Darby & Cushman

[57] ABSTRACT

Gallium is efficiently extracted from strongly basic solutions containing aluminates by extractants having the tris- and/or tetrakis(2-hydroxybenzyl)-1,2-diaminoethane chemical moiety. The diaminoethane derivative may be used together with a hydrocarbyl 8-hydroxyquinoline and/or with a tertiary carboxylic acid.

13 Claims, No Drawings

PROCESS FOR THE EXTRACTION OF GALLIUM

This is a division of application Ser. No. 07/884,230, filed May 11, 1992 now U.S. Pat. No. 5,183,940 which in turn is a continuation application of application Ser. No. 07/068,136, filed Jun. 29, 1992, now abandoned.

This invention is concerned with new compounds which are suitable for use in metal extraction processes, a metal extraction process using such compounds, and particularly a process to extract gallium contained in strongly basic aqueous feed solutions, for example solutions of sodium aluminate more particularly such solutions obtained from the Bayer process for production of alumina.

It is known to extract metals, for example copper or gallium, from aqueous solutions containing the metal by contacting the aqueous solution with a solution of an extractant in a water immiscible solvent and then separating the solvent phase loaded with metal, i.e. containing a part of the metal in the form of a chelate compound with the extractant. The extracted metal can then be recovered from the metal loaded solvent phase by stripping with acid solutions followed, for example, by electrowinning.

The prior art preferred extractant for gallium is a compound available as KELEX 100 which is a 7-hydrocarbyl-8-hydroxyquinoline as disclosed in British Patent 1513398. A similar extractant is available as LIX-26. More particularly, compounds of this type are used for the extraction of gallium from Bayer process aluminate solutions which are strongly basic solutions containing aluminium and gallium in a weight ratio which typically varies from 150 to 1 to 400 to 1. Due to the selectivity of the extractant for gallium, a substantially smaller ratio is obtained in the organic solution after the extraction step. The use of 7-hydrocarbyl-8-hydroxyquinoline provides a very slow rate of extraction and a number of additives have been proposed in order to increase the kinetic rate of extraction. Such additives comprise organs-phosphorus, sulphate or sulphonate compounds and are described in European Patent Applications 0102882 and 0102880. Tertiary carboxylic acids are also disclosed as increasing the rate of extraction, as described in more detail in United States Patent No.4241029. The use of 7-hydrocarbyl-8-hydroxyquinoline has also been found to require the use of a strip solution containing a large excess of acid in order to effect transfer of the gallium from the organic extractant solution into the aqueous strip solution.

We have now found organic compounds of entirely different chemical structure from 7-hydrocarbyl-8-hydroxyquinoline which are good extractants for gallium and some of which give a higher rate of extraction than is achieved with the quinoline derivative. Furthermore, using the new extractants, only a slight excess of acid is required to recover the gallium from the organic extractant phase into the aqueous strip solution.

According to the present invention there is provided a compound of the general formula (A):

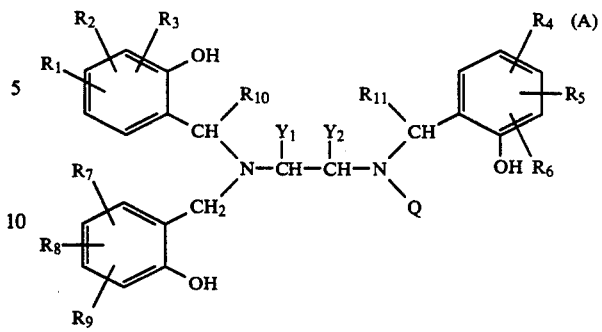

wherein:

Q is a hydrogen atom, a hydrocarbyl group, a substituted hydrocarbyl group or a group $-CH_2Z$;

Z is a $-COOH$ group or a 2-hydroxyphenyl group which may optionally be substituted by the groups $R_{12}$, $R_{13}$ and $R_{14}$;

$R_1$ to $R_9$, and $R_{12}$ to $R_{14}$, which may be the same or different are substituent groups;

$R_{10}$ and $R_{11}$ are each, independently, a hydrogen atom or an alkyl group containing up to 20 carbon atoms;

$Y_1$ is a hydrogen atom, or an alkyl group containing up to 20 carbon atoms, or a phenyl group;

$Y_2$ is a hydrogen atom or an alkyl group containing up, to 20 carbon atoms, or $Y_1$ and $Y_2$, together with the group

form a saturated or unsaturated ring system; and $R_1$ to $R_{14}$, $Y_1$ and $Y_2$ are the same or different and together contain in total from 10 to 60 saturated carbon atoms.

The substituents $R_1$ to $R_9$ and $R_{12}$ to $R_{14}$ are independently hydrogen; hydrocarbyl; alkoxy such as methoxy or 2-hexyldecyloxy; halogen such as chloro or bromo; hydrocarbyl sulphonyl such as methyl sulphonyl or dodecylbenzenesulphonyl; acyl such as acetyl or octanoyl; amino; alkylamino; di-alkylamino such as dioctylamino; alkylacylamino; acylamino such as acetylamino; nitro and cyano, particularly those containing 1 to 20 carbon atoms and especially those containing 6 to 20 carbon atoms. $R_1$ and $R_2$ and/or $R_4$ and $R_5$, if adjacent substituents, may complete a benzo ring so that the corresponding phenyl ring depicted becomes a part of a naphthyl ring.

Without disadvantage in the practice of the invention, the substituents $R_1$ to $R_9$ and $R_{12}$ to $R_{14}$ may be hydrocarbyl groups which are further substituted by groups which are sufficiently inert in the presence of aqueous alkali, for example alkoxy groups. It is preferred however that the substituents $R_1$ to $R_9$ and $R_{12}$ to $R_{14}$ are hydrogen atoms or unsubstituted hydrocarbyl groups, particularly alkyl groups such as ethyl, propyl, isopropyl, n-butyl, tertiary butyl, isopentyl, hexyl, heptyl, octyl, 2-hexyldecyl, isooctadecyl and 2-octyldodecyl. It is especially preferred that the alkyl groups should be methyl or the mixed and highly branched higher tertiary alkyl groups such as tertiary octyl, tertiary nonyl and tertiary dodecyl which are obtained by alkylation of phenols with the mixed olefins which are commercially available.

The group Q may be a hydrogen atom or a hydrocarbyl, particularly a methyl, group. However, it is generally preferred that Q is a group —CH$_2$Z and, in particular, one in which Z is an optionally substituted 2-hydroxyphenyl group.

The groups Y$_1$ and Y$_2$ may, together with the group

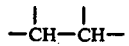

form a ring system, particularly a six membered saturated ring system with the substituted nitrogen atoms being linked to the ring in the 1,2 position. However, it is preferred that the groups Y$_1$ and Y$_2$ do not form a linking group connecting the substituted nitrogen atoms. It is preferred that at least one of Y$_1$ and Y$_2$ is a hydrogen atom. Thus, particularly preferred compounds are those in which Y$_1$ is hydrogen, a methyl group or a phenyl group and Y$_2$ is hydrogen.

The groups R$_{10}$ and R$_{11}$ are preferably the same to facilitate production of the compound and it is particularly preferred that both R$_{10}$ and R$_{11}$ are hydrogen.

To facilitate manufacture of the diamino compound of the present invention it is preferred that R$_3$, R$_6$, R$_9$ and R$_{14}$ are hydrogen and that R$_1$ and R$_4$ are the same, R$_2$ and R$_5$ are the same, R$_7$ and R$_{12}$ are the same and R$_8$ and R$_{13}$ are the same. The substituents which are not hydrogen or alkyl groups are preferably methoxy or nitro groups or especially chloro or bromo groups. The substituents should be predominantly located in positions ortho or para to the phenolic OH groups.

N,N,N',N'-tetrakis-(2-hydroxybenzyl)-1,2-diaminoethane, which is the parent compound of certain of the diamino compounds of the present invention, has been reported by C. G. Pitt and G. Gupta in J.Pharmacol.Exp.Theory 208(1) 12–18 1979, but no reports of its metal complexing properties have appeared.

As is discussed in more detail hereafter, the diamino compounds of the present invention are extractants for gallium. However, the diamino compounds can be used with other compounds to give an increased rate of extraction. More specifically, certain diamino compounds in accordance with the present invention, for example N,N'-bis-(2-hydroxybenzyl)-N,N'-bis(2-hydroxy-5-tertiary nonylbenzyl)-1,2-diaminoethane, may be used as catalysts to increase the rate of extraction of gallium by other extractants which are themselves slower to extract gallium. The primary extractant, whose rate of extraction is to be increased, may itself be a diamino compound in accordance with the invention, or may be a quite different compound such as an 8-hydroxyquinoline derivative, for example a 7-hydrocarbyl-8-hydroxyquinoline material available either under the trade name Kelex 100 or under the trade name LIX-26. The hydrocarbyl group is typically an alkyl or alkenyl group or a mixture thereof. In general the hydrocarbyl group contains at least 6 carbon atoms and not more than 36 carbon atoms, especially from 9 to 24 carbon atoms, for example nonyl, decyl, undecyl, dodecyl, dodecenyl, tridecyl, tetradecyl, octadecyl and the like. If it is being used as a catalyst, it is convenient to add the diamino compound in an amount from 1 to 30% by weight of the weight of primary extractant which is used.

The rate of extraction of gallium using the diamino compounds may be increased by adding an additive to the diamino compound, such additive being, in particular, a carboxylic acid, a sulphur-containing acid or a phosphorus-containing acid. Particularly useful increases in the extraction rate have been attained using a tertiary carboxylic acid, that is a compound having a tertiary group attached directly to the carboxylic acid group. Compounds of this type are of the general formula:

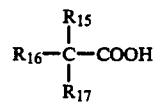

wherein R$_{15}$, R$_{16}$ and R$_{17}$ may be the same or different and are hydrocarbyl or substituted hydrocarbyl groups.

The groups R$_{15}$, R$_{16}$ and R$_{17}$ are preferably alkyl or substituted alkyl groups. The substituents, if present, are hydrocarbonoxy or nitro groups or halo groups such as chloro or bromo. It is preferred that the groups R$_{15}$, R$_{16}$ and R$_{17}$ together contain at least 5 carbon atoms, for example at least 8 carbon atoms. No particular advantage is gained if the groups R$_{15}$, R$_{16}$ and R$_{17}$ together contain more than 45 carbon atoms. We have obtained a useful increase in the rate of extraction of gallium when the diamino compound is used together with a mixture of tertiary carboxylic acids having an average composition of C$_9$H$_{19}$COOH.

The tertiary carboxylic acid is used as a catalyst to increase the rate of extraction of the diamino compound and is conveniently used in an amount of from 1 to 30% by weight relative to the weight of the diamino compound.

A mixture of the diamino compound with a compound effective to increase the extraction rate of gallium may be used as a catalyst for an extractant having a lower rate of extraction, for example a mixture of the diamino compound with a catalytic amount of a tertiary carboxylic acid may itself be added in a catalytic amount to an 8-hydroxyquinoline derivative.

Thus, as a further embodiment of the present invention there is provided a composition which comprises a diamino compound as hereinbefore described, and at least one of an 8-hydroxyquinoline derivative, a carboxylic acid, a sulphur-containing acid and a phosphorus-containing acid.

Sulphur-containing acids which may be used include aryl sulphonic acids such as naphthalene sulphonic acid, for example bis(dodecyl)naphthalene sulphonic acid. Phosphorus-containing acids which may be used include phosphoric acid and the partial esters thereof such as the bis(2-ethylhexyl) ester of phosphoric acid.

A preferred composition comprises a diamino compound, a 7-alkyl and/or 7-alkenyl-8-hydroxyquinoline derivative and a tertiary carboxylic acid. The components of the composition are conveniently present in the proportions of from 1 to 50% by weight of the tertiary carboxylic acid relative to the weight of the quinoline compound and from 1 to 30% by weight of the diamino compound relative to the weight of the quinoline derivative. Preferably the tertiary carboxylic acid is used in the proportion of 10 to 40% by weight relative to the quinoline compound. Preferably, the diamino compound is used in the proportion of 5 to 20% by weight of the quinoline derivative.

The diamino compounds of the invention may be prepared for example by reacting a substituted salicylaldehyde of the general formula I with a diamine of formula II to form a double Schiff's base of formula III which may be reduced by sodium borohydride or, in suitable cases by hydrogenation to the compound of formula IV, following the general procedures described in U.S. Pat. No. 4,338,460. Compound IV may then be reacted either with a suitably substituted acetoxybenzyl bromide V and the product hydrolysed with sodium hydroxide to give the required compound VI following procedures parallel to those described in U.S. Pat. No. 3,632,637. Alternatively compound IV may be reacted with formaldehyde and a suitably substituted phenol VII in a fashion similar to that described in U.S. Pat. Nos. 3,038,793 and 4,338,460 in order to give compound VI; this alternative works best if the phenol VII has substituents in at least the para position.

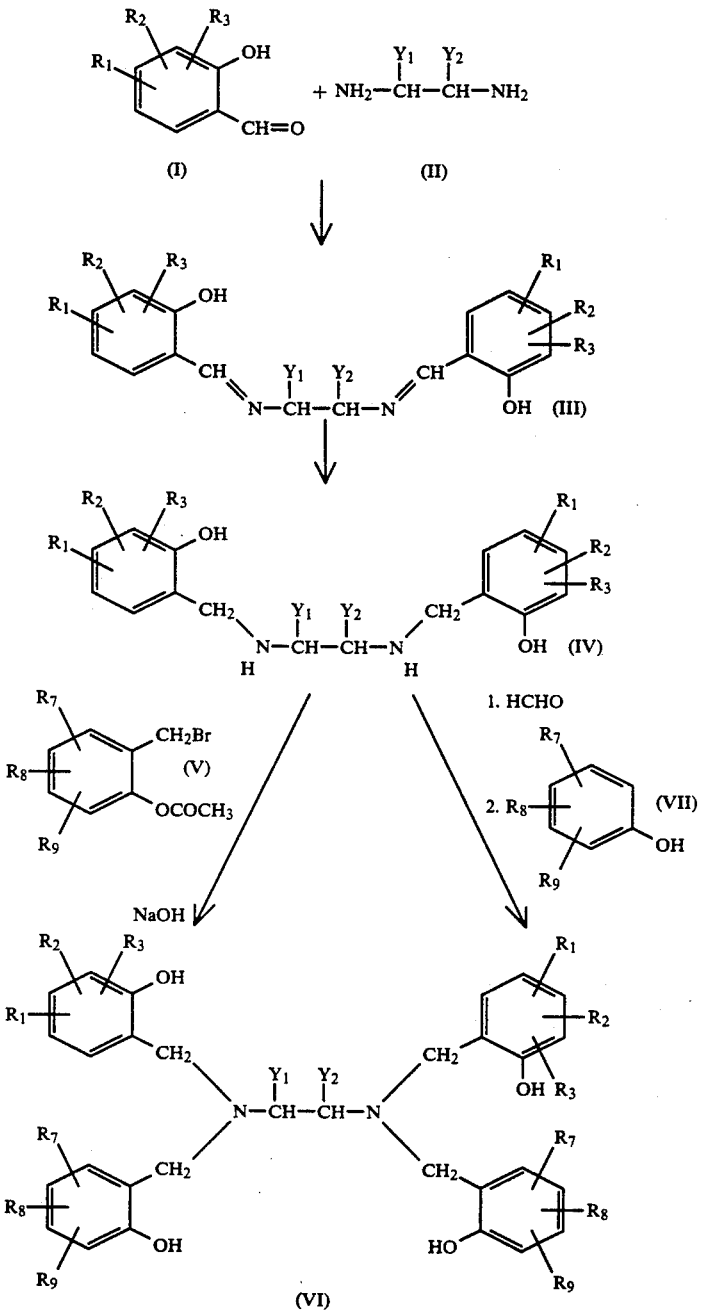

In those cases where $R_1$, $R_2$, $R_3$, $R_7$, $R_8$ and $R_8$ are not identical with $R_4$, $R_5$, $R_6$, $R_{12}$, $R_{13}$ and $R_{14}$ respectively or where the group Q is —$CH_2Z$ where Z is —COOH, a more complicated procedure is required. These compounds may be prepared for example by subjecting a monoamide VIII to the procedures outlined above, but using only one equivalent of the other reactants, in order to prepare a substituted amide IX. The propionyl protecting group may then be removed by hydrolysis to form the corresponding amine X which is reacted with a substituted salicylaldehyde XI and then reduced as described previously to give the extractant XII. Compound XII may be reacted with an o-acetoxybenzyl bromide XIII and then hydrolysed as previously described to give an alkane diamine derivative where Q is —CH$_2$Z and Z is a group

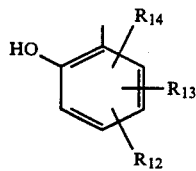

Alternatively, compound XII may be reacted with formaldehyde and a substituted phenol XIV to give the same, or an analogous, alkane diamino derivative.

As a further alternative, the compound XII may be reacted with ethyl monochloroacetate or glycollonitrile and then hydrolysed to give an ethane diamino derivative where Q is —CH$_2$Z and in which Z is —COOH. A similar procedure using glycollonitrile (HOCH$_2$CN) is described in U.S. Pat. No. 4338460.

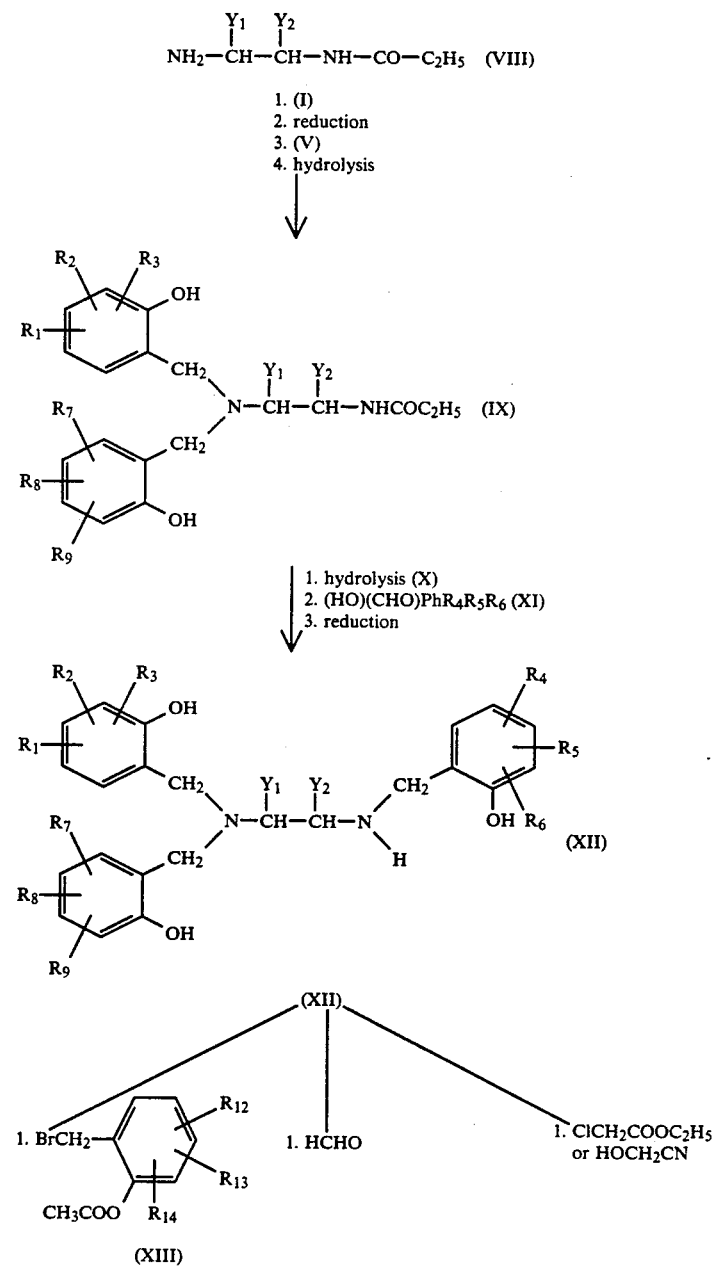

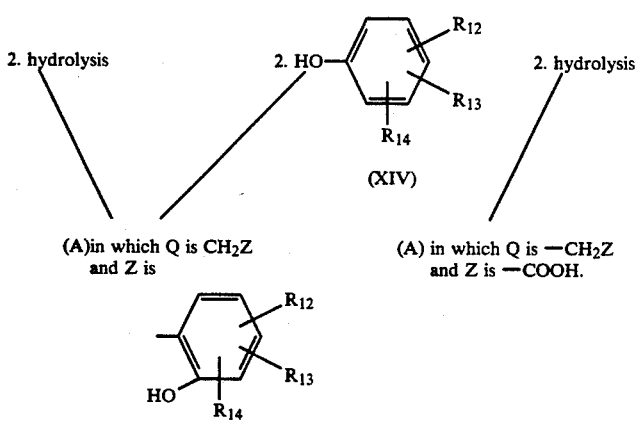

Several modifications or alternatives to these procedures will be obvious to those skilled in the art, thus chloro, bromo and nitro substituents if required may be introduced by reaction of chlorine, bromine and nitric acid respectively with intermediates such as IV, X, XII or with VI or with a compound of the general formula A as the final reaction step. As a further modification, the compound of formula IV may be reacted with 2-hydroxybenzylalcohol to give a produce which is predominantly the tetraphenol of formula VI. However, using this procedure the purity of the tetraphenol VI is generally lower than is obtained when an optionally substituted acetoxybenzyl bromide is used and subsequently hydrolysed. We have found that the less pure product has a lower capacity for the extraction of gallium than the purer product obtained using acetoxybenzyl bromide but gives essentially the same effect if used as a rate-increasing catalyst for a primary extractant such as an 8-hydroxyquinoline derivative.

The preferred compounds of the present invention are the tetraphenols such as the tetraphenol of formula VI. Bis phenols, such as the compound of formula IV, have been found to possess little or no activity when used for the extraction of gallium.

The reaction procedures used to synthesize the products of the invention give rise to by-products. When synthesising tetraphenols, the by-products include triphenols, that is compounds of the general formula (A) in which the group Q is a hydrogen atom. Other by-products include low polymers in which compounds of the general formula (A) are linked to themselves, or to other phenolic moieties derived from the starting materials by, for example, methylene groups or substituted methylene groups. Thus, many of the by-products are, essentially, compounds of the general formula (A) which are further substituted. Compounds of this type are believed to contribute to the uptake of gallium by the product mixture and also to effect the rate at which gallium is extracted. Removal of the by-products from the desired material is difficult and uneconomic. However, since the presence of the by-products does not appear to have a significant deleterious effect on the extraction of gallium, removal of the by-products is generally unnecessary.

According to a further aspect, the invention is also concerned with a process of extracting gallium from basic aqueous solutions.

According to this further aspect there is provided a process for extracting gallium from a basic aqueous solution containing gallium, such process comprising the steps of
(a) contacting an aqueous solution containing gallium with a solution in a water immiscible solvent of at least one diamino compound of the general formula A, as hereinbefore defined;
(b) separating the aqueous phase from the solvent phase which contains a gallium complex compound;
(c) contacting the solvent phase with an aqueous mineral acid (stripping stage) or with an alkaline aqueous solution which is more strongly alkaline than the aqueous solution of steps (a) and (b); and
(d) separating the solvent phase from the aqueous phase containing metal in the form of a salt of the mineral acid or of an oxyanion.

The first step of the process may conveniently be carried out by bringing together the aqueous solution and a solution containing at least one diamino compound of the general formula A, which may be a tri- or tetraphenol or a mixture thereof in the organic solvent. The contacting may be effected at any suitable temperature, for example from ambient temperature up to 100° C., and preferably in the range from 40° C. up to 70° C. The contacting is preferably effected by agitating or otherwise disturbing the mixture of liquids so that the area of the water-solvent interfacial layer is increased in order to promote complex formation and extraction, and then decreasing the agitation or disturbance so that the aqueous and solvent layers settle and can be conveniently separated. The process may be carried out in a batchwise manner or continuously.

The amount of organic solvent to be used may be chosen to suit the volume of aqueous solution to be extracted, the concentration of metals, and the plant available to carry out the process. It is preferred, especially when operating the process continuously, to bring together approximately equal volumes of the organic solution and the aqueous solution.

Examples of suitable water-immiscible organic solvents are aliphatic, aromatic and alicyclic hydrocarbons, chlorinated hydrocarbons such as perchloroethylene, trichloroethane and trichloroethylene. Mixtures of solvents may be used. Especially preferred in conventional hydrometallurgical practice are mixed hydrocarbon solvents such as high boiling, high flash point petroleum fractions (for example kerosene) with varying aromatic content. In general, hydrocarbons having a high aromatic content, for example AROMASOL H which consists essentially of a mixture of trimethylbenzenes and is commercially available from Imperial Chemical Industries PLC (AROMASOL is a trade mark) or SOLVESSO 150 which is 98% by volume an aromatic fraction, has a boiling point range of 190° C. to 210° C. and is commercially available from Esso (SOLVESSO is a trade mark), provide a higher solubility than kerosene for the extractant and its metal complex, whilst a kerosene having a relatively low aromatic content, for example ESCAID 100 which is petroleum distillate comprising 20% aromatics, 56.6% paraffins and 23.4% naphthenes commercially available from Esso (ESCAID is a trade mark) may in certain cases improve the hydrometallurgical performance of the extractant. Factors influencing the solubility of the extractant and its metal complex are complicated, but in general extractants having highly branched substituents and/or an isomeric mixture of substituents have comparatively high solubility. The concentration of the extractant in the water immiscible organic solvent may be chosen to suit the particular aluminate solution to be treated. Typical values of extractant concentration in the organic phase are between 5 and 300 g/liter and an especially convenient range is from 20 to 200 g/liter.

The solvent is preferably a hydrocarbon having a high aromatic content but we particularly prefer to use a solvent which contains an alkanol, especially a higher alkanol which is soluble in the hydrocarbon solvent and of low solubility, or insoluble, in water. Preferred alkanols are those in which the alkyl group contains at least 6 carbon atoms and especially which contains at least 8 carbon atoms. The alkyl group of the alkanol typically does not contain more than 36 carbon atoms and especially contains not more than 24 carbon atoms. Alkanols which may be used as part of the solvent include octanol, nonanol, n-decanol, iso-decanol, dodecanol, tridecanol, hexadecanol and octadecanol. Particularly useful results have been obtained when the alkanol is n-decanol. The alkanol, if present in the solvent is preferably present in an amount of at least 5% by volume of the solvent mixture. Typically, the alkanol is not present in an amount of more than 50% by volume of the solvent mixture and especially does not exceed 30% by volume of the solvent mixture. The presence of an alkanol in the solvent mixture generally results in an improvement in the solubility of the complex of the metal with the extractant and can also result in improved disengagement of the organic and aqueous phases. We have also found that, during stripping of the organic phase with an aqueous acid, salt separation may occur, particularly with a strip solution containing sulphuric acid. The presence of an alkanol in the organic phase reduces, or even prevents, salt separation during the stripping with the aqueous acid.

We have also found that if the organic phase includes a sulphur- or phosphorus-containing acid, the presence of such compounds also reduces salt separation during stripping with an aqueous acid such as sulphuric acid.

As previously noted herein, the diamino compound of the general formula A may be used in conjunction with other materials which are either extractants themselves and/or which catalyse the rate of extraction of gallium from the aqueous solution. Hence, in step (a) of the process, the solution in the water immiscible solvent may contain, in addition to at least one diamino compound of the general formula A, at least one other material which is itself an extractant and/or is effective to increase the rate of extraction of gallium from the aqueous solution.

In particular, in step (a) of the process, the solution in the water immiscible solvent contains, in addition to at least one diamino compound of the general formula A, at least one further compound which is selected from an 8-hydroxyquinoline derivative, a carboxylic acid, a sulphur-containing acid and a phosphorus-containing acid. More particularly, at least one further compound is a 7-alkyl and/or 7-alkenyl-8-hydroxyquinoline and/or a tertiary carboxylic acid.

The diamino compound used in the process of the present invention is preferably a tetraphenol particularly N,N'-bis(2-hydroxybenzyl)-N,N'-bis(2-hydroxy-5-tertiarynonylbenzyl)-1,2-diaminoethane and especially N,N'-bis(2-hydroxybenzyl)-N,N'-bis(2-hydroxy-5-tertiary-nonylbenzyl)-1,2-diaminopropane.

The stripping step may be performed with a mineral acid in water and, in the case of the presence of aluminium, both metals will be recovered. The alternative possibility of stripping with a concentrated aqueous alkaline solution (for example 10 molar NaOH) may also be envisaged in order to obtain differential stripping.

Concentrated hydrochloric acid may also be used in some cases, the gallium then being retained as anion $Ga(Cl_4)^-$ associated with the protonated extractant of the invention.

We have found that, if the stripping step is effected using a mineral acid in water, only a slight excess of acid is necessary in order to recover most of the gallium, typically an excess aqueous concentration of 0.1 to 0.2N over that stoichiometrically required to react with the metal complexes in the organic solution. In contrast to this, using an 8-hydroxyquinoline derivative requires a substantial excess of acid to recover most of the gallium, typically an excess aqueous concentration of 2N to 3N of the acid.

We have also found that the nature of the metal stripped from the organic phase is dependent on the amount of acid added. Thus, as the amount of acid added to the stripping stage is increased, the metals present in the organic phase are stripped in the order sodium, aluminium and gallium. Hence, by stripping in two or more stages, a further separation of gallium can be achieved and an aqueous solution having an improved purity of gallium can be achieved. This effect is illustrated in Example 10.

We have found that the ratio of extraction of gallium is dependent on a number of factors. Thus, further substituents in the aromatic rings of compounds of the general formula A have been found to result in a decrease in the rate of extraction of gallium. Hence, the use of highly substituted compounds of the general formula A is not preferred since such compounds generally result in a decrease in the rate of gallium extraction. The presence of a catalyst such as a tertiary carboxylic acid is also effective to give an increase in the rate of gallium extraction.

We have found that with some compounds of the general formula A, such as the products of Examples 1 and 4, a maximum uptake of gallium into the organic phase occurs after a relatively short contacting time, typically from 5 minutes to two hours, and thereafter the amount of gallium present in the organic phase decreases, typically to about half or less of the maximum value. Accordingly it is desirable when using extractants showing this behaviour to use a contacting time which is substantially the same as the time which gives the maximum level of extracted gallium, preferably from 75% to 125% of the time which gives the maximum level of extracted gallium.

We have found that the maximum level of gallium which can be extracted is dependent on a number of factors, in addition to the nature of the compound of general formula A which is used. Thus, the use of a tertiary carboxylic acid not only increases the rate of gallium extraction but may also increase the maximum level of extracted gallium which can be attained. Furthermore, improving the efficiency of agitation, for example by increasing the rate of stirring of the aqueous and organic phases, also results in an increase in the maximum level of extracted gallium which can be attained. The proportion of gallium extracted, expressed as the ratio of gallium concentration in the organic phase to aluminium concentration in the organic phase, has been found to increase as the concentration, in the organic phase, of the compound of general formula A decreases. However, it will be appreciated that although this effect results in gallium of higher purity in the organic phase, the concentration of gallium extracted into the organic phase is reduced. To achieve gallium of satisfactory purity at an acceptable concentration it is especially preferred that the concentration of the compound of general formula A in the extraction solution is in the range 20–200 grams per liter.

The extractants of the present invention may be incorporated or absorbed on solid insoluble material, for example water insoluble polymers. This offers the possibility of simplifying the extraction process as is well known in the art.

The invention is illustrated by the following non-limitative examples.

EXAMPLE 1

A solution of 1,2-diaminoethane (30 g) in isopropanol (100 cm$^3$) was added dropwise to a solution of 2-hydroxy-5-tertiarynonylbenzaldehyde (248 g) in isopropanol (300 cm$^3$) so that the reaction temperature did not rise above 35° C. Immediate production of a colour indicated formation of the double Schiffs' base. After stirring for 18 hours at room temperature the solution was treated with sodium borohydride (21.7 g) which was added in portions over about 3 hours so that the temperature did not rise above 30° C. The mixture was then stirred for 18 hours at ambient temperature when almost complete discharge of the yellow colour indicated that reduction had taken place. Excess borohydride was decomposed by cautious dropwise addition of 120 cm$^3$ of water, and the pH of the mixture was adjusted to 7 by addition of glacial acetic acid. The mixture was then shaken with 800 cm$^3$ of chloroform and 400 cm$^3$ of water, and the aqueous layer was separated and discarded. The chloroform solution was extracted with two 300 cm$^3$ portions of a 10% w/v aqueous solution of sodium carbonate and then with water, separated and the chloroform was distilled under reduced pressure. Volatile impurities were finally removed by heating the concentrate at 90° C. under a pressure of 0.3 mm of mercury, yielding 280 g of N,N'-bis(2-hydroxy-5-tertiary-nonylbenzyl)-1,2-diaminoethane as a viscous oil. 31.4 g of this oil and 28.8 g of 2-acetoxybenzyl bromide were dissolved in 90 cm$^3$ of acetone and the solution was stirred and boiled under reflux. After 1.5 hours, 13.2 g of anhydrous sodium carbonate and 0.5 g of potassium iodide were added, and boiling under reflux was continued for a total of 36 hours from the start of refluxing. Towards the end of the reaction period, an addition of finely powdered potassium carbonate (4.0 g) was made in order to complete the reaction. The mixture was then cooled and filtered, and the acetone was distilled under a reduced pressure of 20 mm of mercury. The product (53.7 g) was dissolved in ethanol (100 cm$^3$) and a solution of sodium hydroxide (11 g) in 20 cm$^3$ water was added at such a rate that the temperature did not rise above 65° C. The solution was allowed to cool and treated with acetic acid to reduce the pH to 7-8. Hexane (170 cm$^3$), toluene (110 cm$^3$) and ethyl acetate (20 cm$^3$) were added and the mixture was extracted firstly with 200 cm$^3$ of water and then twice with 150 cm$^3$ portions of water. The organic layer was concentrated by distillation of the solvents and finally heated at 90°–100° C at 0.3 mm pressure. On cooling, the product set to a brittle glass-like solid, which was shown by its nuclear magnetic spectrum in deuterochloroform to consist essentially of N,N'-bis-(2-hydroxy- benzyl)-N,N'-bis(2-hydroxy-5-tertiary nonylbenzyl)-1,2-diamino- ethane.

EXAMPLE 2

The ability of the product of Example I to extract gallium from aqueous alkaline solution was demonstrated as follows. A solution (A) simulating a spent Bayer liquor was prepared by dissolving aluminium wire and gallium nitrate in aqueous sodium hydroxide so as to give a solution which analysed as follows: (ppm refers to parts of metal weight in grams, per million cubic centimeter of solution):

| | |
|---|---|
| Alkali (as NaOH) | 195 grams per liter; |
| Al$_2$O$_3$ | 54 grams per liter; |
| Gallium | 144 ppm. |

A solution of tetraphenol extractant, as obtained in Example 1, was prepared by dissolving the extractant in a mixture of 9 parts by volume of SOLVESSO 150 and 1 part by volume of n-decanol so as to give a solution (B) containing 73.7 grams of the extractant per liter of solution. Equal volumes of the solutions (A) and (B) were separately heated to 50° C. and then stirred together at this temperature. After 15 minutes contact, the stirring was stopped and the organic and aqueous layers were allowed to separate. It was found that the organic solution contained 80 ppm of gallium and 1325 ppm of aluminium, that is that more than half of the available gallium but less than 5% of the available aluminium was extracted. The rate of extraction of gallium at ambient temperature was also investigated using an aliquot of solution (B) as before and an aqueous solution similar to (A) but containing 126.5 ppm of gallium. After stirring equal volumes of the solutions together for 1 hour at 20° C. it was found that the organic solution contained 74 ppm of gallium and 900 ppm of aluminium, and after 4 hours that the organic solution contained 93.5 ppm of gallium and 1025 ppm of aluminium. Recovery of extracted metals from the loaded organic solution by stripping with a second aqueous solution was investigated using an organic solution B which had been loaded as described above and was found to contain 71 ppm of gallium and 1300 ppm of aluminium. This solution was agitated at 20° C. with an equal volume of 1.0M aqueous hydrochloric acid. The solutions were separated and analysed after a contact time of 30 minutes, when it was found that, within experimental error all the metals initially present in the organic solution had passed into the aqueous solution.

EXAMPLE 3

An aqueous liquor similar to that described in Example 2, but containing 207 g per liter of NAOH, 51 g per liter of $Al_2O_3$ and 130 ppm of gallium was stirred at 50° C. in a nitrogen atmosphere with an equal volume of an extractant solution prepared by diluting 8.3 g of Kelex 100 (predominantly 7-undecyl-8-hydroxyquinoline) to 100 cm$^3$ with a solvent comprising 9 parts by volume of Escaid 100 and 1 part by volume of n-decanol. The times required to extract different percentages of the total gallium present into the organic solvent are listed in row A below.

A further series of experiments was carried out which differed only in that the extractant solution also contained 0.74 g per 100 cm$^3$ of solvent of the product of Example 1. The results of this series of experiments are given in row B below.

| percentage gallium extracted | 20% | 40% | 60% | 80% |
|---|---|---|---|---|
| A, time in minutes required | 12.5 | 54 | 110 | 202 |
| B, time in minutes required | <1 | 2.5 | 4 | 12 |

The results show that addition of a catalytic quantity of the product of Example I produces an increase in the rate of extraction by Kelex 100 under these conditions, the average increase being about twentyfold.

EXAMPLE 4

A solution of 1,2-diaminopropane (37 g) in methanol (500 cm$^3$) was added dropwise to a solution of 2-hydroxy-5-tert.nonylbenzaldehyde (248 g) in methanol (500 cm$^3$) at a rate such that the reaction temperature did not rise above 50° C. Immediate production of a yellow colour indicated formation of the double Schiff's base. The mixture was then boiled under reflux for 2 hours to ensure completion of the reaction. The methanol was distilled under reduced pressure (20 mm) yielding 271 g of N,N'-bis-(2-hydroxy-5-tert.nonyl-benzylidene)-1,2-propylenediamine as an oil. All of the oil was dissolved in isopropanol (1500 cm$^3$) and then sodium borohydride (42 g) was added in portions over about 3 hours so that the temperature did not rise above 55° C. The mixture was then stirred for 18 hours at ambient temperature when almost complete discharge of the yellow colour indicated that reduction had taken place. Excess sodium borohydride was decomposed by cautious, dropwise addition of water (250 cm$^3$) and the pH of the mixture was adjusted to 7 by addition of glacial acetic acid. The mixture was then shaken with a mixture of ethyl acetate (800 cm$^3$) and water (500 cm$^3$). The aqueous layer was separated and discarded. The ethyl acetate solution was extracted with two 300 cm$^3$ portions of 10% w/v aqueous sodium carbonate solution and then with water (300 cm$^3$). The ethyl acetate was distilled under reduced pressure (20 mm). Volatile impurities were finally removed by heating the concentrate at 90° C. under a pressure of 0.3 mm.Hg for one hour, yielding 215 g of N,N'-bis- (2-hydroxy-5-tert-.nonylbenzyl)-1,2-diaminopropane as a viscous oil.

61 g of this viscous oil was dissolved in acetone (500 cm$^3$) and a solution of 2-acetoxybenzyl bromide (57 g) dissolved in acetone (100 cm$^3$) was added dropwise at ambient temperature. The mixture was then boiled under reflux. After 1 hour anhydrous sodium carbonate (26.4 g) and potassium iodide (5.0 g) were added, and boiling under reflux was continued for a total time of 32 hours. Towards the end of the reaction period an addition of finely powdered anhydrous potassium carbonate (8.0 g) was made in order to complete the reaction. The mixture was then cooled and filtered, and the acetone was distilled from the filtrate under reduced pressure (20 mm and 60° C). The concentrate (111 g) was dissolved in ethanol (500 cm$^3$) and a solution of potassium hydroxide (13.8 g) in water (45 cm$^3$) was added at such a rate that the temperature did not rise above 65° C. The solution was allowed to cool and treated with acetic acid to reduce the pH to 7–8. Ethyl acetate (1500 cm$^3$) was added and the mixture was extracted with water (500 cm$^3$), then with a 10% w/v aqueous sodium carbonate solution (300 cm$^3$) and finally again with water (500 cm$^3$). The ethyl acetate was distilled under reduced pressure (20 mm at 60° C.). The concentrate was heated at 90° C. under a pressure of 0.3 mm.Hg for one hour to remove any volatile impurities. On cooling, the product set to 81.2 g of a brittle glass-like solid, shown by its nuclear magnetic resonance spectrum in deuterochloroform to consist essentially of N,N'-bis-(2-hydroxybenzyl)-N,N'-bis(2-hydroxy-5-tert.nonylbenzyl)-1,2-diaminopropane.

EXAMPLE 5

The ability of the product of Example 4 to extract gallium from aqueous alkaline solution was demonstrated as follows.

A solution (A) simulating spent Bayer liquor was used, this solution being as described in Example 2. A solution of the tetraphenol extractant obtained in Example 4 was prepared by dissolving a sample of the extractant in a mixture of 9 parts by volume of SOLVESSO 150 (as defined) and 1 part by volume of n-decanol so as to give a solution (B) containing 76.8 g of the extractant per liter of solution. Equal volumes of the solutions (A) and (B) were separately heated to 50° C. and then stirred together at this temperature. After 3 hours contact, the stirring was stopped and the organic and aqueous layers were allowed to separate. It was found that the organic solution contained 106 ppm of gallium and 1675 ppm of aluminium, that is more than two-thirds of the available gallium but less than 6% of the available aluminium had been extracted.

EXAMPLE 6

N,N'-bis(2-hydroxy-5-tert.nonylbenzyl)-1,2-diaminoethane (10.4 g) prepared as described in the first part of Example 1, and p-chlorophenol (15.4 g) were dissolved in ethanol (30 cm$^3$). The solution was cooled to 0° C. and aqueous formaldehyde (3.8 g of 32% w/w solution) was added dropwise during 10 minutes. The solution was stirred at ambient temperature for 20 hours, then boiled under reflux for one hour, cooled and extracted with a mixture of hexane (120 cm$^3$) and ethyl acetate (30 cm$^3$). The organic solution was then extracted with four 60 cm$^3$ portions of 1M aqueous sodium hydroxide solution (to remove excess p-chlorophenol) and then shaken with water (50 cm$^3$). Sufficient 1M aqueous hydrochloric acid was added to reduce the pH of the aqueous layer, after shaking the mixture to between 7 and 8. The organic layer was separated and concentrated by distillation of the solvent, finally by heating at 95° under a pressure of 0.05 mm of mercury. The product (12.2 g) set on cooling to a glass-like amber resin. Nmr spectroscopy showed that the resin contained the tetraphenol N,N'-bis(2-hydroxy-5-chlorobenzyl)-N,N'-bis(2-hydroxy-5-tertiary nonylbenzyl)-1,2-diaminoethane together with impurities.

A solution of the resin in a 9:1 by volume mixture of SOLVESSO 150 (as defined) and n-decanol containing 8.06 g of the resin for each 100 cm$^3$ of the solution was gently shaken for 100 hours at 50° C. with an equal volume of an aqueous solution which was 0.2 Molar in gallium (as gallium nitrate) and 2.5M in sodium hydroxide.

Analysis of the organic solution after this time by mass spectroscopy showed that it contained 4150 ppm of gallium. From this, on the basis that the extractant is the specified tetraphenol (M.Wt. 806) and forms a 1:1 complex with gallium, it was calculated that the purity of the resin is 59.5% of the theoretical value.

EXAMPLE 7

This example shows that the rate of extraction of gallium by the resin of Example 6 can be increased by the addition of an organic acid.

An aqueous liquor similar to that described in Example 2, but containing 153 g per liter of sodium hydroxide, 66 g per liter of $Al_2O_3$ and 140 ppm of gallium, was stirred at 50° C. in a nitrogen atmosphere with an equal volume aliquot of an extractant solution prepared as described in Example 6. The times required to extract different percentages of the total gallium present into the organic solution are listed in row A below.

A further series of experiments was carried out which differed only in that 4.01 g per 100 cm$^3$ of solution of a tertiary decanoic acid mixture (Versatic Acid 10 manufactured by Shell Chemicals) were added. The results obtained using this mixture are given in row B below.

| Time | 2 minutes | 10 minutes | 30 minutes |
|---|---|---|---|
| % Total gallium extracted, A | 1.4 | 2.1 | 4.3 |
| % Total gallium extracted, B | 18.2 | 29.6 | 29.3 |

EXAMPLE 8

This example demonstrates an alternative synthesis of the product of Example 1.

N,N'-bis(2-hydroxy-5-tert.nonylbenzyl)-1,2-diaminoethane (333.07 g), prepared as described in the first part of Example 1, was heated with stirring at 110° C. to 120° C. 2-Hydroxybenzylalcohol (88.43 g) was added to this liquor, portionwise, over 5 minutes. After 6 hours at 110° C. to 120° C., a further addition of 2-hydroxybenzylalcohol (88.43 g) was carried out over 5 minutes. Stirring and heating were continued for a total of 23 hours. The mixture was then allowed to cool and ethyl acetate (750 cm$^3$) was added followed by hexane (400 cm$^3$). An orange solution was formed which was washed separately with 1M aqueous sodium hydroxide solution (5×500 cm$^3$) followed by saturated aqueous sodium hydrogen carbonate solution (2×500 cm$^3$). The organic solution was then concentrated under reduced pressure, finally at 0.5 mm at 95° C. for two hours, to yield 412.22 g of a viscous oil which set to a glass-like solid condensate.

This condensate was found by liquid chromatographic analysis to contain N,N'-bis(2-hydroxybenzyl)-N,N'-bis(2-hydroxy-5-tert.nonylbenzyl)-1,2-diaminoethane, although in a lesser proportion than the product of Example 1.

EXAMPLE 9

This Example shows the additional advantage gained by using a mixture of an organic acid and a product of the present invention as a combined catalyst for the extraction of gallium using a 7-alkyl-8-hydroxyquinoline as the primary extractant.

The aqueous liquor described in Example 7 was stirred at 20° C. in a nitrogen atmosphere with an equal volume aliquot of an extractant solution prepared by diluting KELEX 100 (as defined in Example 3) (4.17 g) and a tertiary decanoic acid mixture (2.08 g) (Versatic acid 10) to 50 cm$^3$ with a solvent comprising 9 parts by volume of ESCAID 100 (as defined) and 1 part by volume of n-decanol. The amounts of gallium found in the organic solution (in ppm) after different contact times are listed in row A below.

A further series of experiments was carried out which differed only in that 0.42 grammes of the product of Example 8 were included in the organic solution. The results obtained using this mixture are given in row B below.

| Time | 1 min. | 2 min. | 5 min. | 10 min. | 30 min. |
|---|---|---|---|---|---|
| A, ppm Gallium in organic solution | 64 | 86 | 112 | 119 | 118 |
| B, ppm Gallium in organic solution | 84 | 97 | 121 | 118 | 120 |

It will be observed that the addition of a small proportion of the product of the present invention has produced an increase in the initial rate of extraction of the gallium.

EXAMPLE 10

This demonstrates that a loaded organic solution of an extractant in accordance with the present invention can be completely stripped by a slight excess of an aqueous acid solution and that by the careful addition of the aqueous acid solution the metals sodium, aluminium and gallium can be removed in turn.

22.5 g of the product of Example 4 was made up to a volume of 300 cm$^3$ with a 9:1 v/v mixture of SOLVESSO 150 and n-decanol. This solution was loaded by stirring at 50° C. for two hours with 1500 cm$^3$ of a solution simulating spent Bayer liquor, this solution being as described in Example 2.

The organic solution was separated and was found to contain 93.6 ppm of gallium, 1348 ppm of aluminium and 2788 ppm of sodium. It was calculated from this analysis that an aliquot of the organic solution would need to be contacted with an equal volume aliquot of 0.275 molar aqueous hydrochloric acid in order to extract all of the metals according to the stoichiometric equations

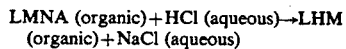
LMNA (organic)+HCl (aqueous)→LHM (organic)+NaCl (aqueous)

and

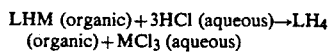
LHM (organic)+3HCl (aqueous)→LH$_4$ (organic)+MCl$_3$ (aqueous)

where
L is the product of Example 4 and

M is aluminium or gallium.

To 25 cm³ aliquots of the loaded organic solution obtained as described, were added 25 cm³ aliquots of aqueous hydrochloric acid of differing molarity and stirring was effected for two hours at 25° C. The aqueous and organic phases were then analysed for metal content from which the percentage of the total of each metal extracted into the aqueous phase could be calculated. The results obtained are set out in tabular form below.

| Molarity of acid solution | % of each metal in aqueous phase | | |
|---|---|---|---|
| | Ga | Al | Na |
| 0.10 | <1 | <0.5 | 16 |
| 0.15 | <1 | 18 | >99.5 |
| 0.20 | <1 | 49 | >99.5 |
| 0.25 | <1 | 74 | >99.5 |
| 0.30 | 3 | 92 | >99.5 |
| 0.35 | 82 | >99.5 | >99.5 |
| 0.40 | 98.4 | >99.5 | >99.5 |
| 0.45 | >99.5 | >99.5 | >99.5 |

It will be observed that essentially all of the sodium is extracted before any appreciable amount of gallium is removed. It will also be noted that most of the aluminium has been extracted before a substantial proportion of the gallium is removed. Furthermore, in the presence of an excess of acid of between 0.05 and 0.2 molar, increasing amounts of gallium are extracted from the organic phase into the aqueous phase, essentially all of the gallium being extracted into the aqueous phase using an excess of acid of 0.2 molar.

EXAMPLE 11

The procedure of Example 6 was repeated using p-cresol (12.96 g) rather than p-chlorophenol to obtain a product containing N,N'-bis(2-hydroxy-5-methylbenzyl)-N,N'-bis(2-hydroxy-5-ter.-nonylbenzyl)-1,2-diaminoethane. The ability of this product to extract gallium from an aqueous alkaline solution, and its active capacity for gallium, were measured by a general test based on the test procedure of Example 6. In the procedure of this general test, a solution of the diaminoethane derivative in a mixture of SOLVESSO 150 and n-decanol (9:1 v/v) was made up so as to be 0.1 molar based on the molecular weight of the pure diaminoethane derivative (in this case MW 765). This solution was gently agitated at 50° with an equal volume of an aqueous solution which was 0.2 molar in gallium (as gallium nitrate) and 2.5 molar in sodium hydroxide. To compensate for differences in the rate of extraction of different diaminoethane derivatives, samples of the organic solution were withdrawn and analysed after 3.5 hours, 20 hours, 85 hours and 100 hours. The highest take up of gallium reached, and the corresponding uptake of sodium are recorded in Table 1, together with the percentage theoretical maximum uptake of gallium calculated on the same assumptions as in Example 6. The general test was also carried out with the products of Examples 1 and 4. The results show that the product of the example is rather slow to extract gallium, but the product has a good active capacity for gallium, and a higher selectivity against sodium than the products of Examples I and 4.

EXAMPLE 12

A modified method, in which formaldehyde was reacted in two stages, was used to prepare a product containing N,N'-bis(2-hydroxy-5-methylbenzyl)-N,N'-bis(2-hydroxy-5-ternonylbenzyl)-1,2-diaminoethane. NN'-bis(2-hydroxy-5-ternonylbenzyl)-1,2-diaminoethane (5.2 g) was dissolved in ethanol (20cm³). Aqueous formaldehyde (0.77 g, strength 39.4% w/w) was added and the mixture was boiled under reflux for 1.5 hours. p-Cresol (10.8 g) was added followed by a further amount of formaldehyde solution (0.77 g) and boiling under reflux was continued for 20 hours. The product formed was concentrated to a glassy resin by distillation of the solvent and excess p-cresol at 90° C. under a pressume of 0.2 mm. The ability of the reaction product to extract gallium from aqueous alkaline solution was tested by the method described in Example 11 with the exception that the organic solution was made up to be 0.9 molar in the product of this example and 0.01 molar in the product of Example 1, the latter being included as a rate catalyst. The results, listed in Table 1, show that a mixture of very high active capacity for gallium had been obtained, and that the rate of extraction had been increased compared to Example 11.

EXAMPLE 13

A product containing N,N'-bis(2-hydroxy-5-methoxybenzyl)-N,N'-bis(2-hydroxy-5-ternonylbenzyl)-1,2-diaminoethane was prepared following the procedure of Example 12, but using p-methoxyphenol (7.45 g) in place of the 10.8 g of p-cresol. The ability of the product to extract gallium from aqueous alkaline solution was tested by the method of Example 11, and the results are listed in Table 1. A second test was carried out in which an organic solution which was 0.1 molar in the product of this example, and 0.01 molar in the product of Example I was used. Both tests gave the same value (56% theoretical) for gallium uptake after 20 hours. It was noted however that after 3.5 hours the first test solution contained only 2.73 g/l gallium whereas the second test solution contained 4.05 g/l gallium.

EXAMPLE 14

A product containing N,N'-bis(2-hydroxy-3,5-dimethylbenzyl)-N,N'-bis(2-hydroxy-5-ternonylbenzyl)-1,2-diaminoethane was prepared by the procedure of Example 12 but using 2,4-dimethylphenol (7.3 g) in place of the 10.8 g of P-cresol. The product obtained was tested by the procedure of Example 11 and results are listed in Table 1.

EXAMPLE 15

N,N'-bis(2-hydroxybenzyl)-1,2-diaminoethane, a white solid having m.p. 120°–121°, was prepared by the procedure described in Example 1 of U.S. Pat. No. 4,338,460. A suspension of this compound (8.1 g) in methanol (20 cm³) was stirred at ambient temperature with saturated sodium bicarbonate solution (10 cm³) and water (10 cm³). Aqueous formaldehyde solution (5.6 g of 32.2% w/w solution) was added dropwise forming a gelatinous suspension which was stirred for 15 minutes and then added during 15 minutes to a solution of ter-dodecylphenol (15.7 g) in methanol (120 cm³) heated to 60°–650°. The mixture was boiled under reflux for 20 hours and then cooled to ambient temperature. A viscous oil separated and the solvent was decanted from this viscous oil which was then extracted with acetone (100 cm³). The acetone extract was filtered and the acetone was distilled, leaving a white solid (9.53 g) containing N,N'-bis(2-hydroxybenzyl)-N,N'- bis(2-hydroxy-5-terdodecylbenzyl)1,2-diaminoethane. The capacity of this product to extract gallium from aqueous alkaline solution was tested by the method of Example 11 and the results obtained are recorded in Table 1. Although the highest take up of gallium was observed after 20 hours it was noted that almost as high a take up had occurred after 2.5 hours when the organic solution contained 2.66 g/l gallium.

EXAMPLE 16

2-Methyl-4-ternonylphenol was prepared by stirring a mixture of 2-methylphenol (186 g), propylene trimer (263 g) and 2-toluenesulphonic acid (35.1 g) and heating at 95° C. for 24 hours. The y, mixture was then cooled and diluted with toluene (500 cm$^3$), the toluene solution was extracted three times with sodium hydroxide (500 cm$^3$ portions of 10% w/v aqueous solution), then with hydrochloric acid (500 cm$^3$ of 2N acid), dried with magnesium sulphate, filtered and distilled. The fraction having a boiling point of 132° C. at 0.2 mm pressure (251 g) was collected.

2-Methyl-4-ternonylphenol (117 g obtained as described), methanol (900 cm$^3$) and freshly prepared 4-nitroso-N,N-dimethylaniline (150 g) which had not been dried after preparation but maintained as a paste in methanol (30 g), and aqueous formaldehyde (150 cm$^3$ of a 40% w/w solution) were stirred together beneath a reflux condenser. Hydrogen chloride gas was passed through the suspension at such a rate as to boil the solvent (62° C.). Reflux temperature and the passage of hydrogen chloride were maintained for 2 hours when all the solid had passed into solution. The solution was cooled and diluted with water (400 cm$^3$) and extracted with chloroform (500 cm$^3$). The chloroform solution was extracted with water until acid free, dried using anhydrous magnesium sulphate and distilled. 2-Hydroxy-3-methyl-5-ternonylbenzaldehyde (112 g) was collected as the fraction of boiling point 122° C. at 0.05 mm pressure.

2-Hydroxy-3-methyl-5-ternonylbenzaldehyde (20 g obtained as described) was reacted with 1,2-diaminoethane (2.29 g) in methanol (100 cm$^3$), and the double Schiffs base obtained (19 g) was reduced with sodium borohydride (2.9 g) in isopropanol (130 g) using the procedure of Example 4, to yield N,N'-bis(2-hydroxy-3-methyl-5-ternonylbenzyl)-1,2-diaminoethane (16.3 g). The procedures of Example 4 were also used to react this compound (6.84 g) with 2-acetoxybenzyl bromide (6.24 g) and to hydrolyse the product, yielding N,N'-bis(2-hydroxybenzyl)-N,N'-bis(2-hydroxy-3-methyl-5-ternonylbenzyl)-1,2-diaminoethane as a glassy solid (7.0 g). The product was shown to extract gallium from alkaline solution by the procedure of Example 11. The results are given in Table 1.

EXAMPLE 17

The procedures of Example 4 were used to react 2-hydroxy5-ternonylbenzaldehyde (15.0 g) with 1-phenyl-1,2-diaminoethane (4.1 g) to give a double Schiffs base which was reduced with sodium borohydride and then reacted with 2 equivalents of 2-acetoxybenzyl bromide to yield a glassy material (19.3 g) containing N,N'-bis (2-hydroxybenzyl)-N,N'-bis(2-hydroxy-5-ternonylbenzyl)-1-phenyl1,2-diaminoethane. The product was shown to extract gallium from aqueous alkaline solution by the procedure of Example 11. Results are given in Table 1.

EXAMPLE 18

This example demonstrates a further method of preparation of a material containing the product of Example 1. N,N'-bis (2-hydroxy-5-ternonylbenzyl)-1,2-diaminoethane (10.5 g), prepared as described in the first part of Example 1, and salicylaldehyde (5.4 g) were dissolved in ethanol (40 cm$^3$) and the solution was agitated in a glass lined vessel in the presence of Raney nickel (3 g) under hydrogen (10 MNm$^{-2}$ pressure) at 120° for 5 hours. The product was digested with hydrochloric acid (100 cm$^3$ of 7% w/w aqueous solution) and ethyl acetate (100 cm$^3$). The mixture was filtered, the organic solution was separated, washed with aqueous sodium carbonate solution (2 molar, 50 cm$^3$) and concentrated under reduced pressure (90° C. at 0.5 mm) to a glassy material (12.0 g) containing N,N'-bis(2-hydroxybenzyl)-N,N'-bis(2-hydroxy-5-ternonylbenzyl)-1,2-diaminoethane. The product was tested by the method of Example 11. The results listed in Table I show that the product has a substantial capacity for extraction of gallium but is not as pure as the material prepared by the method of Example 1.

EXAMPLE 19

A solution of N,N'-bis(2-hydroxy-5-ternonylbenzyl)-1,2-diaminoethane (10.5 g, 0.020 moles), prepared as described in the first part of Example 1, was dissolved in ethanol (50 cm$^3$) and aqueous formaldehyde solution (1.57 g of 40% w/w solution, 0.020 moles) was added with stirring. (In a comparative experiment which was terminated at this stage, it was shown that N,N'-bis (2-hydroxy-5-ternonylbenzyl)imidazolidine had been formed). After 15 minutes, p-cresol (10.6 g) was added and the solution was boiled under reflux for 91 hours. The solution was cooled, diluted with hexane (100 cm$^3$) and ethyl acetate (20 cm$^3$) and extracted successively with 50 portions of water, 1M sodium hydroxide solution, and saturated sodium bicarbonate solution. The organic layer was then separated and the solvents and excess p-cresol were distilled at 90° C. and 0.5 mm pressure leaving 10.2 g of a thick oil believed to consist essentially of N,N'-bis(2-hydroxy-5-ter-nonylbenzyl)-N-(2-hydroxy-5-methylbenzyl)-1,2-diaminoethane. This material was tested for its capacity to extract gallium from aqueous alkaline solution by the method of Example 11 and results are listed in Table 1. For comparative purposes, the starting material N,N'-bis(2-hydroxy-5-ternonylbenzyl)-1,2-diaminoethane and the intermediate imidazolidine, isolated from the comparative experiment, were also submitted to the same test.

The results show that the diphenol and the imidazolidine extract only very small amounts of gallium in contrast to the much greater proportion of gallium extracted by the products of the present invention, which are tri- and tetra-phenols.

EXAMPLE 20

The triphenol N-(2-hydroxybenzyl)-N,N'-bis(2-hydroxy-5-ternonylbenzyl)-1,2-diaminoethane was prepared using a more specific synthesis than the route used in Example 18. The synthesis used is such as to exclude the possibility that the product contains other than in a very small amount, a tetraphenolic compound as an impurity.

N-Propionyl-1,2-diaminoethane (58 g, 0.5 moles) was added, over a period of 10 minutes to a stirred solution of 2-hydroxy-5-ternonylbenzaldehyde (130 g, estimated strength 96%, 0.5 moles) in methanol (100 cm³). The temperature rose spontaneously from 25° to 50° C. The solution was allowed to cool, was stirred for 20 hours and then concentrated by distillation of the methanol under reduced pressure (60° C., 0.5 mm pressure) to give a thick oil (179 g). The bulk of this oil (173 g) was dissolved in isopropanol (500 cm³), stirred and heated to 40°-50° C. in a nitrogen atmosphere. Sodium borohydride (5.0 g) was added portionwise during 2.5 hours with occasional cooling to maintain the temperature below 50° C. The mixture was stirred for a further 2 hours at 50° C., then cooled and any excess borohydride was destroyed by the cautious addition of water (100 cm³). Sodium carbonate solution (2 molar, 100 cm³) was added, and the pH was then adjusted to 7 by addition of dilute hydrochloric acid. Most of the isopropanol was distilled under reduced pressure, the residue was extracted into ethyl acetate (500 cm³), the ethyl acetate solution was washed twice with water (each time 300 cm³) and concentrated at 90° C. and 0.5 mm pressure to give N-(2-hydroxy-5-ternonylbenzyl)-N'-propionyl-1,2-diaminoethane, an oil which set to a glass on cooling (169 g).

104 g of the product thus obtained was dissolved in acetone (950 cm³), boiled and stirred under reflux whilst 2-acetoxybenzyl bromide (68.7 g) was added during 10 minutes. Anhydrous potassium carbonate (37.1 g) and potassium iodide (18.5 g) were added and the mixture was stirred and boiled under reflux for 20 hours. It was then cooled, filtered and the acetone removed under reduced pressure (20 mm pressure). The residue was redissolved in ethanol (500 cm³), and the solution was stirred and heated to 40° C. To this solution was added dropwise a solution of sodium hydroxide (17.5 g) in water (50 cm³) at such a rate as to maintain the temperature at 40°-45° C. The solution was then stirred at 45°-50° C. for 2 hours. Concentrated hydrochloric acid was then added to reduce the pH to 8-9 (22 cm³ required). The solution was filtered, the filtrate was concentrated under reduced pressure (20 mm pressure) to remove most of the ethanol and extracted into chloroform (500 cm³). The chloroform solution was extracted with water (3×400 cm³) and then concentrated at 90° C. and 0.5 mm pressure to N-(2-hydroxybenzyl)-N-(2-hydroxy-5-ternonyl-benzyl)-N'-propionyl-1,2-diaminoethane (116.5 g).

A solution of the amide (28.2 g) in methanol (200 cm³) was warmed to 40° C. and concentrated hydrochloric acid solution (36% strength, 40 cm³) was added. The temperature rose spontaneously to 52° C. Water (20 cm³) was added and the solution was boiled under reflux for 20 hours. The solution was then cooled, water (50 cm³) was added and the mixture was adjusted to pH 8 with sodium hydroxide solution (32%). A heavy oil was precipitated. The mixture was stirred for 18 hours at ambient temperature and the solvent layer was decanted. The residual oil was extracted with ethyl acetate (100 cm³), the solution was filtered and concentrated under reduced pressure (20 mm pressure) to a reddish solid (23.7 g). The solid was dissolved in a mixture of hexane (50 cm³) and ethyl acetate (50 cm³), stirred at ambient temperature for 18 hours with saturated sodium carbonate solution (50 cm³), then with water (100 cm³) and again concentrated (90° C., 1.0 mm pressure) to yield crude N-(2-hydroxy-benzyl)-N-(2-hydroxy-5-ternonylbenzyl)-1,2-diaminoethane (20.3 g).

All of the diphenol-diaminoethane derivative (nominally 0.051 moles) was dissolved in ethanol (300 cm³) and boiled under reflux for 3 hours with 2-hydroxy-5-ternonylbenzaldehyde (12.64 g, 0.051 mol). The solvent was then distilled (90° C., 1.0 mm pressure) yielding the crude Schiffs base (32.5 g). The proton nmr spectrum of this material measured in deuterochloroform with tetramethylsilane as internal standard, showed absorptions due to the group —N=CH— of the Schiffs base ($\delta$=8.2) and excess of the aldehyde (—CHO, $\delta$=9.8) in approximate integral ratio of 4:1, indicating that the purity of the crude primary amine had been about 80% of theoretical as measured by the amount of primary amine groups present. The product was dissolved in isopropanol (300 cm³) and reduced with sodium borohydride (2.2 g) as previously described. The crude product after distillation of solvent was purified by dissolution in hexane (200 cm³) and passage of hydrogen chloride gas through the solution when amine hydrochlorides were precipitated, collected by filtration, reslurried with hexane (200 cm³) and again collected. The solid was stirred with saturated sodium carbonate solution (100 cm³) and the mixture was extracted firstly with hexane (100 cm³) at ambient temperature and then with ethyl acetate (100 cm³) at 60° C., when all passed into solution. The organic extracts were combined, dried (using anhydrous MGSO₄) and concentrated by distillation of solvent at 90° C. and 1.0 mm pressure to a reddish glassy solid (22.3 g) consisting essentially of N-(2-hydroxybenzyl)-N,N'-bis(2-hydroxy-5-ternonyl-benzyl)-1,2-diaminoethane.

The capacity of this material to extract gallium from aqueous solution was tested by the procedure of Example 11, with the exception that the solutions were analysed after contact times of 1.5, 2,5 and 18.5 hours. The results are listed in Table 1.

TABLE 1

| Example or Comp. Ex. (a) | Highest take-up of gallium observed (g/l in organic solution) (b) | Corresponding take-up of sodium (g/l in organic solution) (b) | Time to highest take-up (hours) (b) | % theoretical gallium extracted (c) |
|---|---|---|---|---|
| 1 | 4.35 | 2.60 | 3.5 | 62 |
| 4 | 4.60 | 1.75 | 3.5 | 66 |
| 6 | 4.15 | 2.12 | 100 | 59.5 |
| 11 | 4.45 | 1.32 | 85 | 64 |
| 12 + 1 | 5.85 | 2.23 | 20 | 84 |
| 13 | 3.90 | 1.60 | 20 | 56 |
| 13 + 1 | 4.33 | 1.90 | 20 | 56 |
| 14 | 4.33 | 1.48 | 20 | 62 |
| 15 | 2.97 | 1.67 | 20 | 43 |
| 16 | 4.00 | 1.53 | 20 | 57 |
| 17 | 2.68 | 3.93 | 3.5 | 38 |
| 18 | 3.30 | 1.30 | 3.5 | 47 |
| 19 | 3.13 | 1.50 | 3.5 | 45 |
| A | 0.33 | 1.80 | 20 | 4.7 |
| B | 0.19 | 0.53 | 20 | 2.7 |

TABLE 1-continued

| Example or Comp. Ex. (a) (a) | Highest take-up of gallium observed (g/l in organic solution) (b) | Corresponding take-up of sodium (g/l in organic solution) (b) | Time to highest take-up (hours) (b) | % theoretical gallium extracted (c) |
|---|---|---|---|---|
| 20 | 4.13 | 1.43 | 1.5* | 59 |

Notes to Table 1
(a) The number is the example in which the preparation of the extractant is described. In all cases the extractant was used as a 0.1 Molar solution with the exception of (13 + 1) which was 0.1 Molar in the Example 13 product and 0.01 Molar in the Example 1 product. (12 + 1) is a mixture of 0.09 Molar of the Example 12 product and 0.01 Molar of the Example 1 product. A is N,N'-bis(2-hydroxy-5-ternonylbenzyl)-1,2-diaminoethane. B is N,N'-bis(2-hydroxy-5-ternonylbenzyl)-imidazolidine.
(b) Samples were taken at various times and analysed to determine the amount of gallium extracted. The quantities recorded are the maximum amount of gallium extracted, the amount of sodium extracted at the maximum of gallium and the time (in hours) at which the maximum of gallium was attained. *Samples were taken after 1.5, 2.5 and 18.5 hours.
(c) This is based on the assumptions set out in Example 6, namely the compound, or mixture of compounds, forms a 1:1 complex with gallium. Since a 0.1 Molar solution of compound (0.11 Molar solution of total compounds when using the mixture of 13 + 1) is used, the theoretical concentration which the gallium could attain in the organic solution is 0.1 Molar (or 0.11 Molar).

EXAMPLE 21

The procedure of Example 4 was repeated. The product obtained was subjected to the test described in Example 5 with the modification that the organic solution was adjusted periodically for gallium and aluminium, giving the results listed in columns A below. A second test was carried out at the same time, which differed only in that the organic solution contained 38.4 g/l of bis(2-ethylhexyl)phosphoric acid in addition to the 76.8 g/l of extractant. The results are listed in columns B below.

| Time (minutes) | Metal concentration in organic solution (ppm) | | | |
|---|---|---|---|---|
| | A gallium | A aluminium | B gallium | B aluminium |
| 15 | 50.5 | 975 | 54 | 800 |
| 30 | 67 | 1100 | 71.5 | 925 |
| 60 | 82 | 1200 | 85.5 | 1050 |
| 120 | 85 | 1275 | 92 | 1175 |
| 300 | 79.5 | 1200 | 83.5 | 1225 |

The results show that inclusion of the bis(2-ethylhexyl) phosphoric acid produced an increase in the rate of extraction of gallium, and in the maximum uptake of gallium obtained.

EXAMPLE 22

The test procedure of Example 5 was repeated using a single I organic solution containing 76.8 g/l of the product of Example 20, together with 38.4 g/l of VERSATIC ACID 10, with the further difference that the temperature at which the organic solution and the simulated Bayer liquor were stirred together was 65° C. The metal concentrations obtained after increasing contact times are listed below.

| Time (minutes) | Metal concentration in organic solution | | |
|---|---|---|---|
| | Gallium (ppm) | Aluminium (g/l) | Sodium (g/l) |
| 2 | 54.5 | 1.05 | 7.1 |
| 5 | 74.5 | 1.10 | 6.7 |
| 10 | 103.5 | 1.20 | 6.8 |
| 30 | 104.5 | 1.28 | 6.7 |
| 60 | 97 | 1.30 | 6.8 |
| 120 | 80.5 | 1.35 | 6.9 |
| 240 | 56.5 | 1.30 | 6.8 |

-continued

| Time (minutes) | Metal concentration in organic solution | | |
|---|---|---|---|
| | Gallium (ppm) | Aluminium (g/l) | Sodium (g/l) |
| 1200 | 34.5 | 1.45 | 6.1 |

The results show a maximum in the amount of gallium extracted and in the ratio of gallium to aluminium extracted, such that under these conditions the aqueous and organic phases are most efficiently contacted for a time between about 10 and about 30 minutes.

COMPARATIVE EXAMPLE C

The procedure of Example 4 was repeated with the exception that 1,3-diaminopropane was used as a starting material rather than 1,2-diaminopropane. The reactions were effected in the manner described in Example 4 and a product containing essentially N,N'-bis(2-hydroxybenzyl)-N,N'-bis(2-hydroxy-5-ternonylbenzyl)-1,3-diaminopropane was obtained.

The ability of this material to extract gallium from aqueous alkaline solution was tested by the procedure of Example 5, using an organic solution containing 76 g/l of the product per liter of solution. The amounts of gallium and aluminium extracted into the organic solution were analysed after a series of increasing contact times with the results listed below.

| Time (minutes) | Metal concentration in organic solution | | |
|---|---|---|---|
| | Gallium (ppm) | Aluminium (g/l) | Sodium (g/l) |
| 5 | <2.5 | 150 | 4.5 |
| 30 | <2.5 | 150 | 4.5 |
| 60 | <2.5 | 150 | 4.7 |
| 360 | <2.5 | 150 | 5.3 |

The results show that the 1,3-diaminopropane derivative is ineffective as an extractant for gallium from strongly alkaline solution, in contrast to the 1,2-diaminoethane derivatives of the present invention.

What is claimed is:

1. A process for the extraction of gallium from a basic aqueous solution containing gallium comprising the steps of:
    (a) contacting an aqueous solution containing gallium with a solution in a water immiscible solvent of at least one compound of the formula (A),

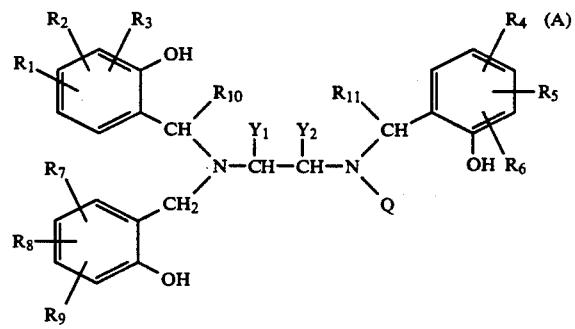

wherein:
Q is a hydrogen atom, a hydrocarbyl group or a group —$CH_2Z$;
Z is a —COOH group or a 2-hydroxyphenyl group which may optionally be substituted by the groups $R_{12}$, $R_{13}$ and $R_{14}$;

$R_1$ to $R_9$, and $R_{12}$ and $R_{14}$, which may be the same or different, are substituent groups selected from hydrogen, hydrocarbyl, alkoxy, halogen, hydrocarbyl, sulphonyl, acyl, amino, nitro and cyano or, when $R_1$ and $R_2$ and/or $R_4$ and $R_5$ are adjacent substituents they may complete a benzo ring and $R_1$ to $R_9$ and $R_{12}$ to $R_{14}$ are such that the substituents on at least one of the rings are different from the substituents on at least one other of the rings;

$R_{10}$ And $R_{11}$ are each, independently, a hydrogen atom or an alkyl group containing up to 20 carbon atoms;

$Y_1$ is a hydrogen atom, or an alkyl group containing up to 20 carbon atoms, or a phenyl group;

$Y_2$ is a hydrogen atom or an alkyl group containing up to 20 carbon atoms, or $Y_1$ and $Y_2$, together with the group

form saturated or unsaturated ring system; and $R_1$ to $R_{14}$, $Y_1$ and $Y_2$ are the same or different and together contain in total from 10 to 60 saturated carbon atoms, (b) separating the aqueous phase from the solvent phase which contains a gallium complex compound;

(c) contacting the solvent phase with an aqueous mineral acid or with an aqueous solution which is more strongly alkaline than the aqueous solution of steps (a) and (b); and (d) separating the solvent phase from the aqueous phase containing metal in the form of a salt of the mineral acid or of an oxyanion.

2. The process according to claim 1 wherein in the compound of Formula A,

Q is H or —$CH_2Z$;

Z is 2-hydroxyphenyl $R_1$ and $R_4$ are hydrocarbyl;

$R_2$ and $R_3$ are H;

$R_5$ to $R_{11}$ are H;

$Y_1$ is H or methyl; and $Y_2$ is H.

3. The process according to claim 2 wherein $R_1$ and $R_4$ are the same and are selected from the mixed and higher tertiary alkyl groups which are obtainable from propylene trimer, propylene tetramer and mixtures thereof.

4. The process of claim 3 wherein $R_1$ and $R_4$ are selected from tertiary octyl, tertiary nonyl and tertiary dodecyl.

5. The process of claim 1 wherein the compound of Formula A is N,N'-bis(2-hydroxybenzyl)-N,N'bis(2-hydroxy-5-tertiarynonylbenzyl)-1,2-diaminoethane or N,N'-bis(2-hydroxybenzyl)-N,N'-bis(2-hydroxy-5-tertiarynonylbenzyl)-1,2-diaminopropane.

6. The process of claim 1 wherein the solution of the compound of Formula A in a water immiscible solvent further includes (a) a 8-hydroxy-quinoline carrying a 7-($C_{6-36}$-alkyl)- or 7-($C_{6-36}$-alkenyl)- group or (b) a tertiary carboxylic acid.

7. The process of claim 1 wherein the solution of the compound of Formula A in a water immiscible solvent further includes (a) a 8-hydroxy-quinoline carrying a 7-($C_{6-36}$-alkyl)- or 7-($C_{6-36}$-alkenyl)- group and (b) a tertiary carboxylic acid.

8. The process of claim 6 wherein the 7-($C_{6-36}$-alkyl)- or 7-($C_{6-36}$-alkenyl)- group is selected from the group consisting of nonyl, decyl, undecyl, dodecyl, dodecenyl, tridecyl, tetradecyl and octadecyl.

9. The process of claim 7 wherein the 7-($C_{6-36}$-alkyl)- or 7-($C_{6-36}$-alkenyl)- group is selected from the group consisting of nonyl, decyl, undecyl, dodecyl, dodecenyl, tridecyl, tetradecyl and octadecyl.

10. The process of claim 6 wherein the hydroxyquinoline is 7-undecyl-8-hydroxyquinoline.

11. The process of claim 6 wherein the hydroxyquinoline is 7-undecyl-8-hydroxyquinoline.

12. The process of claim 6 wherein the tertiary carboxylic acid is of the formula:

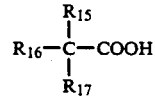

wherein $R_{15}$, $R_{16}$ and $R_{17}$ are alkyl which together contain from 6 to 45 carbon atoms.

13. The process of claim 7 wherein the tertiary carboxylic acid is of the formula:

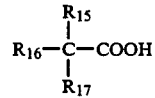

wherein $R_{15}$, $R_{16}$ and $R_{17}$ are alkyl which together contain from 6 to 45 carbon atoms.

* * * * *